(12) United States Patent
Eckendorff

(10) Patent No.: US 6,786,671 B1
(45) Date of Patent: Sep. 7, 2004

(54) DEVICE FOR FIXING THE HUB OF AN ARM OF A WINDSCREEN WIPER

(75) Inventor: Jean-Pierre Eckendorff, Claville (FR)

(73) Assignee: Societe de Recherches d'Etudes et de Valorisation, Claville (FR)

( * ) Notice: Subject to any disclaimer, the term of this patent is extended or adjusted under 35 U.S.C. 154(b) by 0 days.

(21) Appl. No.: 09/979,837

(22) PCT Filed: May 26, 2000

(86) PCT No.: PCT/FR00/01433
§ 371 (c)(1),
(2), (4) Date: Nov. 28, 2001

(87) PCT Pub. No.: WO00/73110
PCT Pub. Date: Dec. 7, 2000

(30) Foreign Application Priority Data

May 28, 1999 (FR) .............................................. 99 06773
Mar. 31, 2000 (FR) .............................................. 00 04108

(51) Int. Cl.[7] .................................................. F16B 2/18
(52) U.S. Cl. ..................... 403/374.1; 403/326; 403/329; 403/365; 403/367; 403/373; 15/250.31; 15/250.34
(58) Field of Search ....................... 15/250.001, 250.31, 15/250.34; 403/1, 326, 329, 345, 365, 367, 373, 374.1, 408.1, 409.1, 374.2, 374.3, 374.4, 366, 368, 370

(56) References Cited

U.S. PATENT DOCUMENTS 2,193,724 A    3/1940  Horton
2,885,230 A  *  5/1959  Terpin ...................... 15/250.34
2,994,900 A     8/1961  Smithers
3,085,821 A  *  4/1963  Rick ........................ 15/250.34
3,419,299 A    12/1968  Oishei
5,621,943 A  *  4/1997  Berge et al. .............. 15/250.34
5,699,582 A    12/1997  Berge et al.
6,550,097 B1 *  4/2003  Zimmer .................... 15/250.34

FOREIGN PATENT DOCUMENTS

EP    0 835 792    4/1998
FR    0 339 236    8/1995

* cited by examiner

Primary Examiner—Anthony Knight
Assistant Examiner—Michael P. Ferguson
(74) Attorney, Agent, or Firm—Young & Thompson

(57) ABSTRACT

A device for fixing the hub of an arm of a wind-screen wiper (2) on a pivoting axis (1) with locking elements (6, 7) for the arm on the pivoting axis (1), a cavity (32) which is created in the hub (2) and is provided with adjusting and angular positioning elements for the arm in relation to the axis (1), whereby the hub (2) rests on the base of a stop (3) which nestles on a radius of operation (4) of the said axis (1); the locking elements (6, 7) are adapted in such a way that they can be engaged in a locking or unlocking position, the adjusting elements includes a connecting ring (10) which is rotationally fixed to the axis (1) and accommodated in the cavity (32) of the hub (2) with a certain amount of play allowing for limited relative angular displacement between the connecting ring (10) and the hub (2) when the locking elements (6, 7) are in an unlocked position, whereby all relative displacement is prohibited between the connecting ring (10) and the hub (2) when the locking elements (6, 7) are in a locked position.

22 Claims, 12 Drawing Sheets

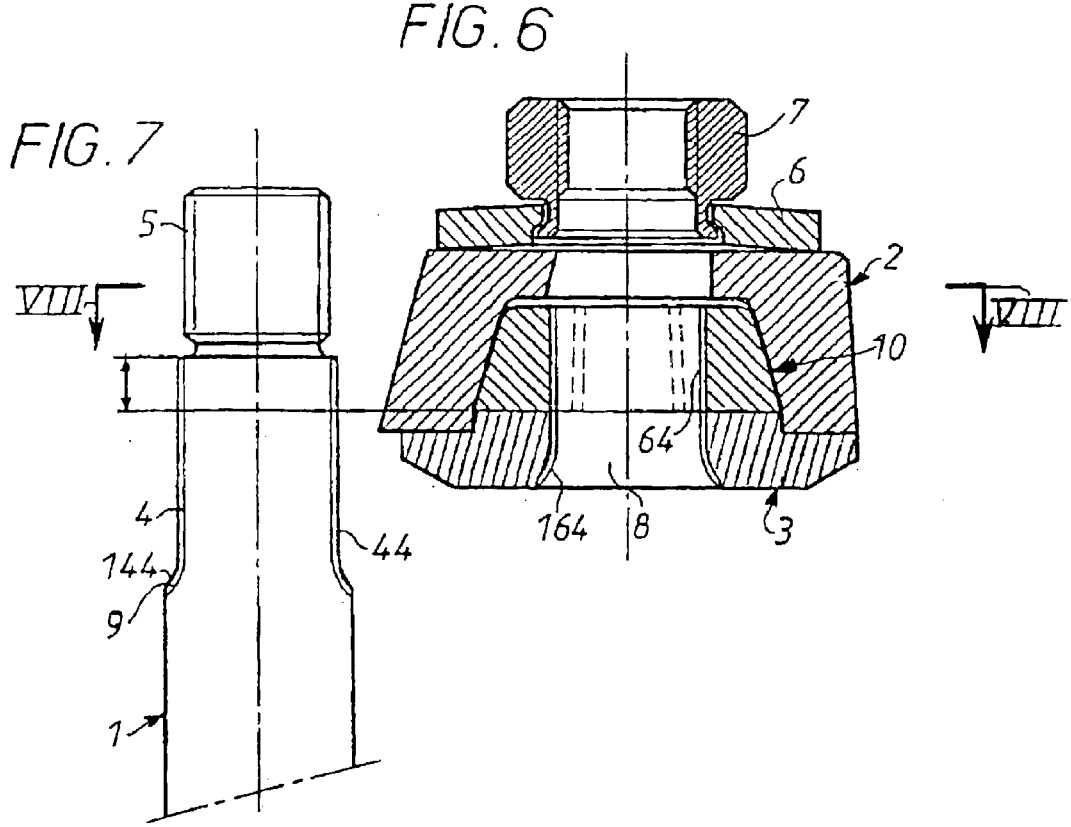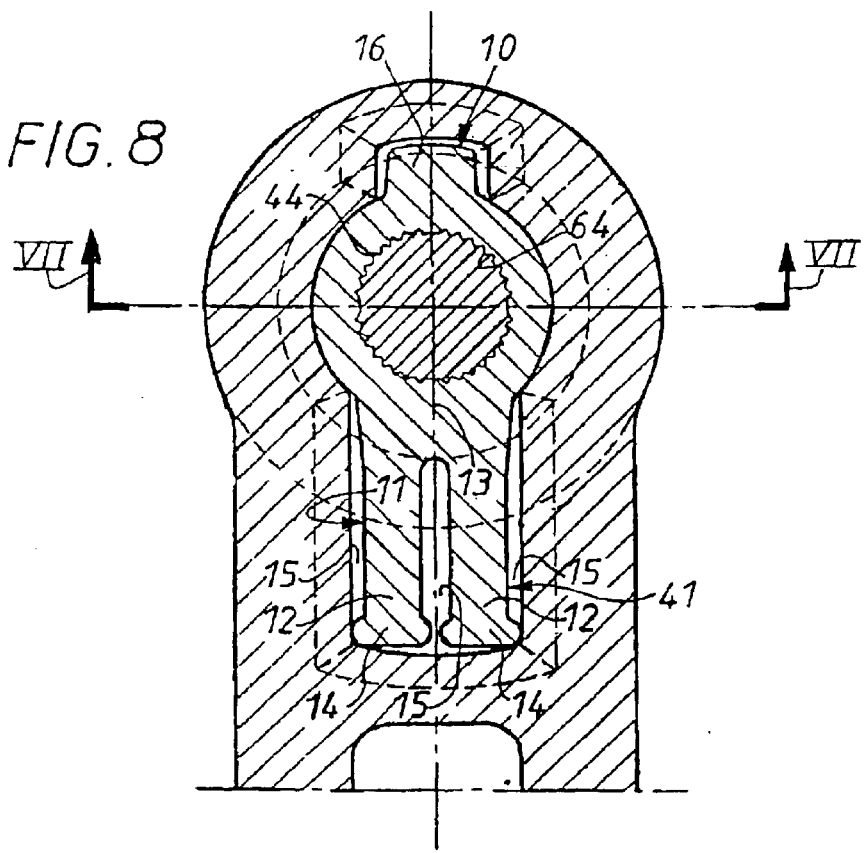

DEVICE FOR FIXING THE HUB OF AN ARM OF A WINDSCREEN WIPER

BACKGROUND OF THE INVENTION

The present invention relates to a windshield wiper arm fixing device, in particular for windshields of automotive vehicles.

The importance of reliable and correct fixing of such equipment to the performance of the windshield wipers and therefore to safe driving of the vehicle in rainy or snowy weather is well known. In the devices most widely used at present, the ends of the oscillating spindles to which the windshield wiper arms are fixed have a screwthreaded part onto which is screwed a nut for locking the arm, the screwthreaded part, which is of smaller diameter than the oscillating spindle, being joined to the latter by a generally frustoconical bearing surface with regular splines along the generatrices of the frustum of the cone.

Existing arms have a corresponding frustoconical mounting hole which, when first fitted, is forced over the splined part of the spindle, whose splines are then imprinted into the bore of the arm, which is generally made of a metal softer than the steel of the spindle, such as a zinc-based alloy known as Zamak or an aluminum-based alloy.

The imprinting of the splines in the bore prevents the shaft rotating relative to the spindle. However, this type of assembly, although simple and inexpensive, is not very resistant to demounting and does not guarantee that the arm is perpendicular to its rotation axis, in particular where it is nested over the splined frustoconical part.

If an adjustment in its position proves necessary, clamping it again in a different angular position on the surface of the bore of the arm, which already has splines imprinted in it, will take place on top of the original splines, causing them to be chewed up, and the splines will no longer be able to transmit the drive torque for the windshield wiper arm. For this reason, automotive vehicle manufacturers scrap any windshield wiper arm that is mounted incorrectly, either on the production line or as a repair, and replace it with a new one in order to guarantee mechanical strength and to avoid a reduced locking effect and risks of deformation on the clamping surfaces that can lead to defective positioning of the arm. The quality of the assembly will depend on the care with which the arm was initially positioned on the production line.

This type of mounting on a splined frustoconical bearing surface does not accurately control the axial hi position of the arm on the spindle because, although the nature of the materials used enables the male splines on the steel spindle to be impressed into the female cone of the frustoconical bearing surface, the frustoconical shape adopted makes it difficult to maintain the assembly tension (the materials used, which are generally soft metals, having a tendency to creep), degrading the quality of the connection, and the shaft then turns within the female frustoconical bearing surface without driving the windshield wiper.

On the other hand, if the frustoconical assembly is well designed and functions correctly, it is inherently self-wedging and an extractor is required to demount it.

Moreover, with a frustoconical bearing surface, especially a short one, it is difficult to guarantee that the arm is perpendicular to its spindle. Any such defect of perpendicularity leads to malfunctions and in particular to serious variations in the intended wiping speed and to noise and vibration of the rubber windshield wiper blade.

Pressed sheet metal arm drivers give rise to other problems. Being made of steel, the marking of the frustoconical bearing surface of the driver by the splines on the spindle will be very superficial, because of the hardness of the material and the particularly small height of the bearing surface, and this will necessitate significantly increasing the assembly pressures

SUMMARY OF THE INVENTION

The subject matter of the present invention is a windshield wiper arm structure which enables precise adjustment of its angular position, combined with low cost, and which can be mounted quickly, in a single operation, with easy adjustment of the angular location of the windshield wiper arm.

According to the invention, a device for fixing a windshield wiper arm hub to the spindle with locking means for locking the arm to the spindle, a cavity formed in the hub containing means for adjusting the angular position of the arm relative to the spindle, said hub bearing on an abutment base nested over a bearing surface of the spindle, is characterized in that, the locking means being adapted to assume either a clamping position or an unclamping position, said adjustment means include a connecting ring constrained to rotate with the spindle and accommodated in said cavity of the hub with some play allowing limited relative angular movement between the connecting ring and the hub in the unclamping position of the locking means, whereas all relative movement between the connecting ring and the hub is prohibited in the clamping position of the locking means.

Advantageously, said angular play of the connecting ring inside the cavity of the hub is determined by nesting of the connecting ring along a polygonal contour.

Accordingly, the contour of the connecting ring can be integrated with the shaft to nest it directly in the complementary cavity of the hub, and the same spring means can be disposed between the shaft and the hub, which eliminates the use of a connecting ring without excessively complicating the shape of the end of the arm. A bearing surface of polygonal shape, for example hexagonal shape, will be formed directly on the shaft, that bearing surface being nested inside a corresponding cavity of the hub having the same, but slightly larger, shape to enable angular play of the arm on the shaft.

Preferably, an angular movement buffering spring member is disposed in a space between the inside of the hub and the outside of the connecting ring.

In this variant, to damp end of sweep impacts on each reversal of the direction of operation, there is provided in the space directly separating the shaft from the hub a buffer member such as a leaf spring of appropriate shape that will equally make it possible to retain the arm in its theoretical adjustment position relative to the shaft.

Advantageously, the connecting ring has a cylindrical outside contour nested inside a corresponding bore of the hub, its rotation in said bore being angularly limited by at least one radial rib able to oscillate in at least one corresponding radial housing of the hub, spring means being disposed between the radial walls of the rib and the facing radial walls of the radial housing.

In a preferred embodiment the connecting ring will have a cylindrical outside contour nested inside a corresponding bore of the hub, its rotation in that bore being angularly limited by at least one radial rib able to oscillate in a corresponding, slightly wider groove in the hub, a larger radial rib being disposed in a larger cavity of the hub, for example in the portion thereof extending along the axis of the arm, bearing buffering spring means being disposed between the radial walls of the rib and the facing radial walls of the cavity. These spring means also determine the theoretical angular location on first fitting and retain the ring, thus facilitating fitting the arm to the shaft in its theoretical centered position and holding it in position during assembly.

There will then be provided a controlled range of adjustment of the angular position of the arm, in elastic bearing engagement. Once fitted, the arm will be locked by tightening the assembly nut with the locking washer, as previously.

Preferably, a metal outer shell forms a housing around the hub.

The arm according to the invention has an end for assembly onto the spindle consisting of a composite structure characterized by an external shell, preferably of pressed sheet metal, forming a drive housing of the windshield wiper arm, which housing is open at the bottom, has a hole at the top through which the spindle passes, and receives means for locking the arm onto the spindle such as a nut with a locking washer or an assembly screw, depending on the types of assembly concerned, this housing containing a separate hub, which is made from a molded or cast material, such as a plastics material or Zamak, aluminum, magnesium, etc., is adapted to receive means for adjusting the angular position of the arm, is nested in and fastened to the housing, and has shapes complementary to those of said housing to fasten the hub into the housing and constrain them to rotate together. The hub can equally be fastened to the housing by other means such as molding, pins, crimping, clipping, or riveting.

This composite structure facilitates complex and precise shaping of the hub by molding, combined with sufficient strength, imparted by covering the housing with sheet steel, which acts as a reinforcing band on the hub and its adjustment and assembly mechanisms and provides a particularly rigid connection to the windshield wiper arm, in particular in the case of a long arm.

The simplest shape for this kind of composite hub could be applied in particular to nesting over spindles with splined frustoconical bearing surface, as in the prior art, but whose bore is extended, starting from the larger base of the frustum of the cone or from its toroidal extension, by a guide sleeve nested over the rod of the spindle and guaranteeing a perpendicular assembly. This first application thereby remedies the main defect of assemblies using spindles with splines on a frustoconical bearing surface.

A variant hub will have a frustoconical bearing surface bore whose larger base can be connected to the cylindrical rod of the spindle by a toroidal connecting surface forming a abutment and therefore improving axial location of the nested hub of the arm, which has an initially smooth surface on which the splines of the spindle will be imprinted. This strengthens the adjustment on a frustoconical bearing surface. The smooth frustoconical bearing surface of the hub has at its larger base end a rounded portion whose toroidal surface nests over and abuts against a splined toroidal surface of complementary shape extending the splines of the frustoconical bearing surface of the spindle as far as its outside diameter.

To improve the rotational interlocking of the frustoconical nesting arrangement, instead of being regularly distributed in the usual way, the splines on the frustum of the cone of the shaft could be irregularly or randomly distributed, so that at least some of them nest correctly in some of the splines imprinted on the smooth frustoconical surface of the arm when it was first fitted.

With regularly distributed splines, if the shaft is offset by one half-tooth, for example, relative to the splines imprinted in the arm, the tips of all the teeth on the shaft will face the tips of all the teeth that were imprinted in the hub during first assembly. This cannot occur with irregularly distributed splines because at least some of them will be in the correct position.

Advantageously, the arm is held perpendicular to the spindle by the abutment base, which abuts on a transverse bearing surface of the spindle.

The perpendicularity of the arm will advantageously be controlled by this abutment base, which can be made from a sintered metal, and whose central hole will have a splined surface that nests over the splined bearing surface of the spindle, said base abutting on the bottom of that bearing surface, which ensures its perpendicular and axial position relative to the spindle through a self-locking assembly with no wedging effect, as well as the perpendicularity of the hub, which bears on this abutment base, whose cylindrical surface provided with a shoulder for centering the hub closes the cavity in the hub containing the means for adjusting the angle of the arm.

To prevent creep due to crushing of the hub when it is clamped against the abutment, the flanks of the housing will have a predetermined height relative to the hub and will bear against the abutment base to maintain the required assembly pressure.

For assemblies on spindles with a cylindrical splined bearing surface, the perpendicularity of the arm thereon is controlled by a abutment base, which can be made from a sintered metal, and whose central hole has a splined surface that nests over the splined bearing surface of the spindle, said base abutting against the end of that bearing surface, which ensures its perpendicular and axial position relative to the spindle by a self-locking assembly with no wedging effect, and also the perpendicularity of the hub which bears on this abutment base, whose circular surface provided with its centering shoulder closes the cavity in the hub containing the means for adjusting the angle of the arm.

Preferably, the height of the flanks of the housing relative to the hub is such that they bear against the abutment base.

Advantageously, the shapes of the housing and the hub and the height of the flanks of the housing relative to the hub are such that the bottom and the flanks of the housing bear on the top and the flanks of the hub, respectively, said hub itself bearing on the abutment base, the flanks of the hub being splined.

Preferably, the connecting ring is constrained to rotate with the spindle by means having cooperating or complementary shapes.

Advantageously, said means having cooperating shapes consist of splines.

Preferably, said means having cooperating shapes consist of polygons, advantageously squares.

Advantageously, the means with cooperating shapes are carried directly by the connecting ring and means with cooperating shapes are carried by the spindle.

Preferably, the connecting ring is constrained to rotate with the spindle by the abutment base, the means with cooperating shapes are carried by the abutment base and means with cooperating shapes are carried by the transverse bearing surface of the spindle, complementary means, which are advantageously indexed, being provided for driving of the connecting ring by the abutment base.

Advantageously, the spindle includes a "polarizer" device consisting of gaps left by missing splines and the splines of the connecting ring of the hub include polarizer splines with no gaps between them, the resulting solid members corresponding to the gaps left by the missing splines of the spindle, the abutment base including a full complement of splines.

Preferably, the radial rib has an elastic end portion adapted to bear on a portion of the corresponding wall of the radial housing.

Thus the windshield wiper arm according to the invention will be mounted on the screwthreaded end of its spindle, in a manner that is known in the art, by locking it by means of an appropriate nut and Washer in a hole of the hub at the end of the arm against a bearing abutment base fastened to the spindle, said end hub having on its locking bearing face a housing in which is nested a connecting ring constrained to rotate with the end of the spindle but free to rotate by a small amount and against a resisting spring bearing force, said assembly being characterized in that the connecting ring has at least one flexible radial rib disposed in a corresponding housing of the hub receiving the connecting ring, rotation of the windshield wiper arm relative to its spindle and the connecting ring in elastic bearing engagement being ensured by elastic flexing of said radial rib bearing against the corresponding wall of its housing.

Advantageously, the radial rib can flex elastically because it has a projecting shape at its end which alone bears on the wall of its housing and allows free flexing of the rib in the housing.

Preferably, the radial rib has at least one flexing lug.

Advantageously, the length of the flexing lugs is less than the radial depth of the housing, the base of the rib forming an abutment bearing on a portion of the corresponding wall of the housing limiting angular movement of the arm while it is being adjusted during first fitting or if it is loosened.

Advantageously, there is at least one angular movement abutment rib on the periphery of the connecting ring.

Preferably, the connecting ring is nested in the corresponding cavity of the windshield wiper arm hub with a taper.

Advantageously, the taper of the external contour of the connecting ring and the corresponding walls of the cavity of the hub is at least equal to or greater than the taper of the arm hub enabling its direct extraction from the mold.

Preferably, the locking means include a nut and a locking washer held in position on the external face of the windshield wiper arm hub by a centering bead thereon which is concentric with the exit hole for the screwthreaded end of the spindle.

Advantageously, it consists of a pre-assembled subassembly at the end of the windshield wiper arm including, on the one hand, a nut and a locking washer held in position on the external face of the windshield wiper arm hub by a retaining fork having two top teeth bearing on the washer on either side of the nut and two bottom teeth bearing on the abutment base on either side of the hole for fitting it over the spindle, the bottom teeth being connected by a semifrustoconical shape forming a funnel to facilitate guiding the end of the spindle into the hole in the abutment base.

Preferably, the distance from the bearing face of the connecting ring on the abutment base to the entry of the screwthread of the nut is greater than the distance between the entry of the means with complementary shapes carried by the spindle and the top of the screwthread on the shaft, so that the means with complementary shapes of the ring can be engaged over the means with complementary shapes of the spindle before tightening the nut.

Advantageously, the distance from the face of the abutment base bearing on the transverse bearing surface on the spindle to the entry of the screwthread of the nut is greater than the distance between the entry of the means with complementary shapes carried by the spindle and the top of the screwthread on the shaft so that the means with complementary shapes of the abutment base can be engaged over the means with complementary shapes of the spindle before tightening the nut.

The invention also relates to eliminating noise generated by windshield wipers due to their effectiveness varying as a function of the pressure with which they are pressed onto the windshield. The noise can be caused by poorly controlled inclination of the rubber blade relative to the surface of the windshield, to which may be added excessive pressure of the arm bearing spring. The blade then tends to jerk and cause the whole of the arm to vibrate.

The curved shape of the windshield may also vary from one supplier to another, and it can be beneficial to modify the bearing pressure by increasing the tension of the spring, rather than adding a spoiler whose aerodynamic effect would increase that bearing pressure.

According to the invention, this problem will be solved by articulating the abutment base to the spindle so that it can be adjusted, either in terms of its normal position perpendicular to its attachment spindle or offset by a positive or negative angle relative to that position.

Advantageously, the transverse bearing surface on the drive spindle over which the abutment base is nested includes at least two diametrally opposite flats, limited in the lengthwise direction by shoulder surfaces, which are concave and provided with teeth perpendicular to the spindle and parallel to each other, the abutment base being nested over the bearing surface of the spindle with a clearance enabling it to tilt relative to its normal perpendicular position, and having convex toothed bearing surfaces nesting over the concave toothed shoulder surfaces of the drive spindle, the mutual nesting of the teeth of the bearing surfaces maintaining the chosen inclination of the abutment base when it is being first fitted.

Preferably, the shoulder surfaces on the spindle and the bearing surfaces on the abutment base are segments of cylindrical surfaces of a cylinder whose axis intersects the spindle perpendicularly thereto.

Advantageously, the shoulder surfaces on the spindle and the bearing surfaces on the abutment base are sectors of a sphere whose center is on the spindle and form a ball-joint locked by the nesting of the teeth, the 90° relative location of which enables longitudinal sliding of the nested teeth for adjusting the relative location of the perpendicular sets of teeth.

Two adjustment solutions can then be envisaged:

The simpler one, in particular during fitting on the production line, consists of adjusting only one factor at a time, either the tension or the inclination of the bearing spring of the rubber wiper blade, which will be obtained with the same spindle, the same abutment and the same adjuster ring, and therefore without modification of the components, by pivoting the orientation of the spindle 90° relative to its drive link, as a function of the required adjustment during fitting to the vehicle, by locating the arm by means of two opposed concave and convex toothed bearing surfaces on the abutment and on the spindle.

The second solution will simultaneously make it possible to:

Adjust the bearing pressure.

Adjust the inclination of the rubber blade.

Adjust both at once.

For example, it may be beneficial to impart a positive or negative angle to the rubber blade, retaining the possibility of remaining neutral or increasing or reducing the bearing pressure.

In this case, two sets of concave toothed shoulder surfaces on the spindle and convex toothed bearing surfaces on the abutment base will be used, forming a bearing surface composed of sectors of a spherical dome centered on the spindle and enabling ball-joint type adjustment of the inclination of the abutment base, the double set of mutually nested teeth ensuring that it is retained in the chosen position.

It will be noted that this solution for adjusting the sweep position by adjusting the position of the bearing abutment base is still very simple and inexpensive, the shapes of the bearing surfaces and the teeth being easily obtained on the spindle by cold stamping and on the abutment by cold stamping or sintering.

Preferably, the spindle has four flats which impart a square section on it and over which is nested the abutment base, whose bearing base is inclined and which transmits that inclination to the connecting ring, constrained to rotate with the bearing base of the abutment base by complementary means consisting of four tongues over which it is nested, different angular locations of the connecting ring and therefore of the windshield wiper arm being obtained by modifying the relative location of the abutment base on its nesting square on the spindle by 90° or 180°.

Advantageously, a washer is disposed between the abutment base and the base of the square on the spindle over which it is nested, the washer having on its face bearing on the abutment a concave toothed surface on which a convex toothed surface of the abutment base bears.

The play between the hub and the ring enabling the angular location to be varied by an amount of the order of several degrees, sufficient for adjusting the position of the windshield wiper, can be ensured by nesting the connecting ring in its cavity of the hub with a clearance along a contour that does not allow the ring to rotate in its cavity, such as a polygonal contour limiting the possibility of angular movement. After placing the arm in the required angular position, the stacked hub and housing will be locked in position against the abutment base by tightening the nut and its arm locking washer to the end of the spindle.

The above kind of device will advantageously consist of a pre-assembled sub-assembly at the end of the windshield wiper arm and including, on the one hand, the nut and its locking washer, held in position on the outside face of the housing, for example by locating lugs formed in the sheet metal of the housing or by a washer equipped with lugs provided with retaining claws, facing the exit hole of the screwthread end of the spindle, and, on the other hand, the assembly of the abutment base, connecting ring and locating spring clipped into the corresponding cavity of the hub, in turns fastened to the housing by studs heat-welded into corresponding holes in the sheet metal of the housing. On demounting, the nut, retained by the mounting lugs, will act as an extractor to facilitate demounting the complete sub-assembly without requiring any other tools.

When this arm sub-assembly pre-assembled in this way is fitted to the end of the shaft, the distance from the bearing face of the connecting ring on the abutment base to the entry of the splines on the shaft will advantageously be greater than the distance between the entry of the screwthread of the nut and the top of the screwthread on the shaft, so that the splines of the ring can be engaged over the shaft before tightening the nut. In this way the ring is engaged over the splines of the shaft before the nut abuts on the end of the screwthread on the shaft to retain the arm angularly on the shaft, so that the operative no longer has to hold the arm in position and therefore has both hands free to fit the second arm and adjust and lock both arms simultaneously.

On the assembly line, the operator will only have to fit this sub-assembly over the splined part of the spindle.

Advantageously, the length over which the hub of the windshield wiper arm is nested, including the length over which the combination of the abutment base and the connecting ring is engaged over the spindle, ensures retention of the hub on the spindle and bracing of the hub to press the windshield wiper blade onto the windshield.

Then the operative will only have to place the windshield wiper arm in the required position with one hand and, holding his nut driver in the other hand, tighten the nut to lock the arm in position. This will minimize assembly time and this adjustment will be repeatable subsequently under any circumstances.

To avoid errors in orienting the arm when fitting it as indicated above, a "polarizer" device is provided enabling the hub of the arm to be mounted on the splines of the shaft in only one position. To this end, the shaft has splines missing, leaving gaps, which enables the abutment, with a fill complement of splines, to be fitted in any orientation, which facilitates assembly, although the connecting ring of the hub of the arm includes polarizer splines with no gaps between them, the resulting solid members corresponding to the gaps because of the missing splines on the spindle, as a result of which the connecting ring can be mounted in only one indexing position, the only theoretically required position, from which the orientation of the arm can be finally adjusted at the level of the angular abutments of the connecting ring in their larger cavities provided with spring means formed in the hub of the arm, as previously described.

This embodiment of a windshield wiper arm structure offers secure positioning of the arm on its spindle, including after demounting, and enables a precise angular position adjustment, if necessary, whilst still being of low cost and compatible with existing mounting spindles, on which this arm will be mounted on vehicle assembly lines by a simple and fast assembly operation less dependent on the human factor, with possible easy adjustment of the angular location of the windshield wiper arm.

The elastic flexing of the radial rib will advantageously be procured by providing a projecting shape such as a bead at its end, that alone will bear on the wall of its housing and allow free flexing of the rib in that housing. To combine flexibility for flexing with sufficient mechanical strength, the radial rib will consist of a plurality of parallel flexing lugs having the same flexing flexibility but whose resistances to flexing will be additive. These lugs could be shorter than the rib, whose more solid base will then form an abutment limiting the angular displacement of the arm during its adjustment on fitting. One or more small solid ribs can also be provided on the periphery of the connecting ring, depending on the required strength, providing this angular displacement limiting abutment function. Considerable adaptability of the assembly structure is therefore obtained by appropriately dimensioning the connecting ring and its rib or ribs.

In this kind of configuration the connecting ring must reconcile the requirements of material flexibility, enabling elastic deformation in flexing of the radial rib, and sufficient mechanical strength of the splines in its bore, which have to be nested over the corresponding splines on the spindle. According to another feature of the invention, the nesting of the connecting ring in the corresponding cavity of the hub will include a taper.

In addition to its conventional function of facilitating molding, that taper will have the result, during locking of the arm on the spindle, compressing the connecting ring in its housing, of exerting a component of pressure perpendicular to the spindle resulting in an effect of banding the connecting ring onto the spindle, which significantly reinforces the splined 1 assembly. Moreover, this taper prevents complication of the tooling for pressure casting the arm, by the provision of demountable parts, if the arm has a skewed shape necessitating a mold extraction plane inclined relative to the spindle. Tapering the outside contour of the connecting ring and the corresponding walls of its housing at an angle at least equal to or greater than that inclination will enable direct extraction of the arm from the mold without adding supplementary mobile members in the mold.

Accordingly, by a dimensional adjustment of the connecting ring as a function of the material chosen and operating constraints, fixing the windshield wiper arm according to the invention will enable easy adaptation to all types of windshield wiper, at moderate cost.

Clearly, the invention:

ensures that the windshield wiper is driven securely, even if the clamping is inadequate, provides an incompressible mounting in which the assembly tension is maintained by compression spring means, achieves a perfectly perpendicular and precise axial position of the arm on its spindle, transmits high drive torques and is more rigid than existing arms, can be demounted without special tools and replaced quickly and securely in the same position without any possibility of error and as many times as may be necessary throughout the service life of the vehicle, enables the three adjustments provided (sweep, twist, blade pressure) to be modified without demounting any component, including the clamping nut and its washer, does not necessitate any modification to existing fabrication techniques and improves the method of mounting the windshield wiper arm on the production line, enables the windshield wiper arm to remain in its theoretical position on the spindle of its own accord, before tightening the nut, so that the operative has his hands free, and can be mounted interchangeably on the main spindle diameters already in use.

BRIEF DESCRIPTION OF THE DRAWINGS

To explain the subject matter of the invention better, embodiments shown in the accompanying drawings will now be described by way of illustrative and non-limiting example only.

In the drawings:

FIG. 6 shows a variant arm assembly in accordance with the invention in section taken along the line VII—VII in FIG. 8;

FIG. 7 shows the spindle only in elevation;

FIG. 8 is a view in section taken along the line VIII—VIII in FIG. 6;

DESCRIPTION OF THE PREFERRED EMBODIMENT

Figure 1:
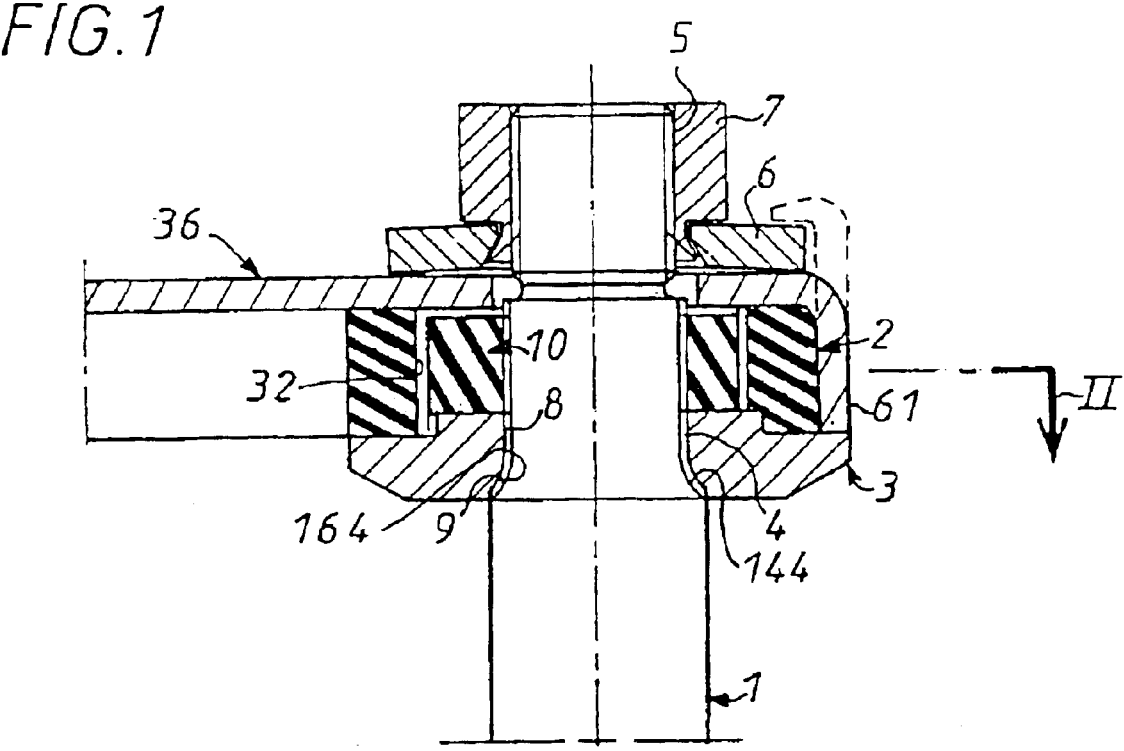
FIG. 1 shows a composite arm hub in accordance with the invention adapted to be mounted on a spindle with assembly splines on a frustoconical bearing surface, partly in section taken along the line I in FIG. 2.
Figure 2:
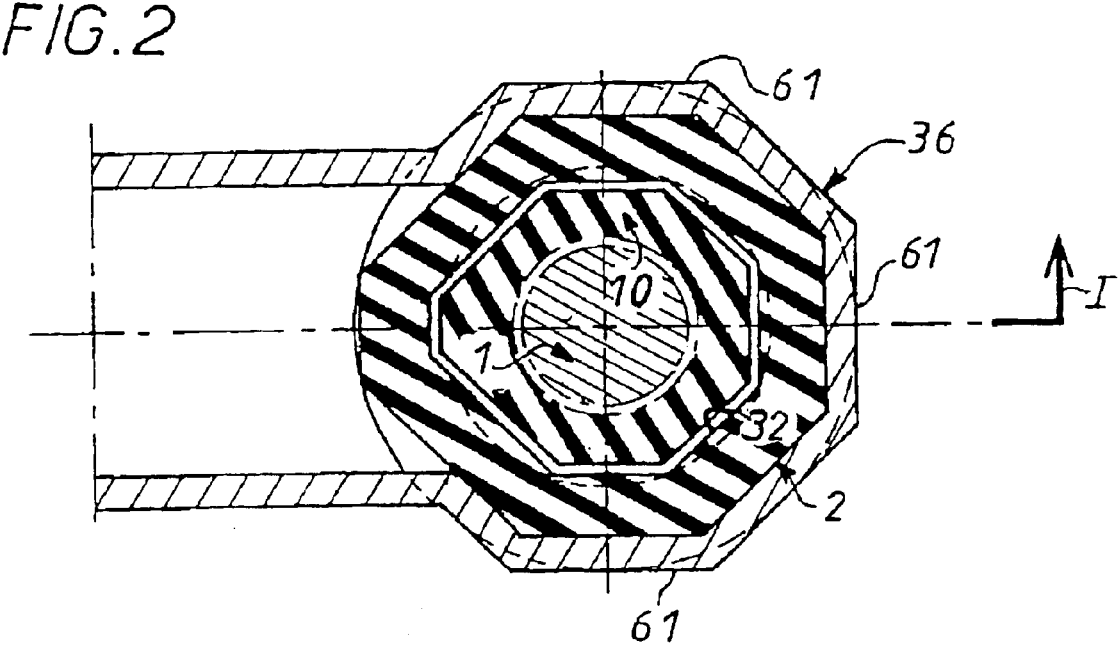
FIG. 2 is a view in axial section taken along the line II in FIG. 1.

FIGS. 1 and 2 show the end of an arm in accordance with the invention is assembled to a spindle 1 of the type with splines on a cylindrical bearing surface. The plastics material hub 2 is nested inside a sheet metal housing 36 to which it is fastened by any appropriate means, not shown, such as pins, thermoformed studs, etc. The hub 2 bears on a abutment base 3 which can be made of sintered steel and includes a central hole 8 with splines complementary to those of a bearing surface 4 on the spindle 1; the area 9 connecting the splined bearing surface of the spindle 1 to its smooth part also carries splines 144 over which splines 164 on the abutment base 3 nest, with a self-locking action with no wedging effect, this nesting guaranteeing its perpendicular and axial position relative to the spindle 1, and therefore that of the windshield wiper arm, the portion of the spindle 1 with the splines 144 constituting the transverse bearing surface of the spindle 1.

A connecting ring 10 between the spindle 1 and the hub 2 includes, as previously, a bore with a splined surface nesting over the splined bearing surface of the spindle 1. Its outside surface has a polygonal contour that locates in a cavity 32 in the hub 2, in this example a polygonal cavity, with some play to allow limited relative angular movement, of the order of 3 degrees, between the ring 10 and the rub 2, sufficient for adjusting the position of the windshield wiper. Because of the aforementioned play, the arm can be placed in the required angular position before locking it with the nut 7 and the washer 6. FIG. 2 shows one example of a polygonal contour with play, in this example an octagonal contour.

After adjusting the angular position of the arm, tightening the nut 7 onto its adjoining washer 6 covering the circular orifice at the bottom of the housing 36 locks the perpendicular and angular position of the arm by virtue of the hub 2 bearing on the abutment base 3. To limit creep caused by crushing of the hub 2 when it is clamped against the abutment base 3, the flanks 61 of the housing 36 will have a predetermined height relative to the hub 2 and will bear against the abutment base 3 to maintain the required assembly pressure.

It will be noted that the windshield wiper arm will continue to function in the event of accidental loosening of the nut 7. The play freed up by it loosening, causing additional impacts at the end of its sweep, will immediately alert the driver to the fault.

Figure 3:
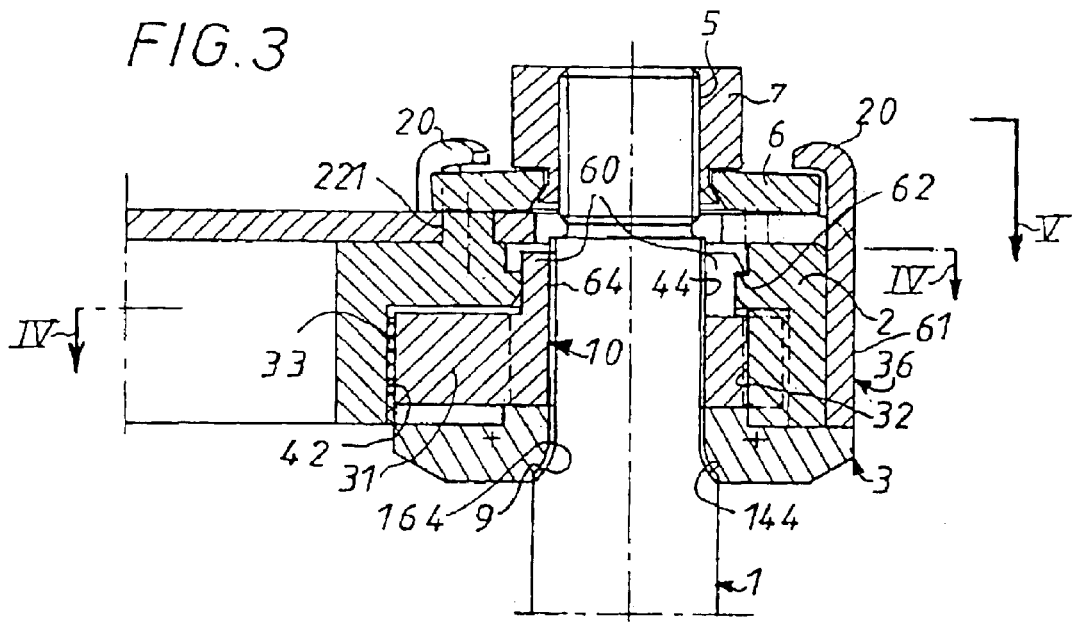
FIG. 3 is a view analogous to the figure, in section taken along the line III—III in FIG. 4.
Figure 4:
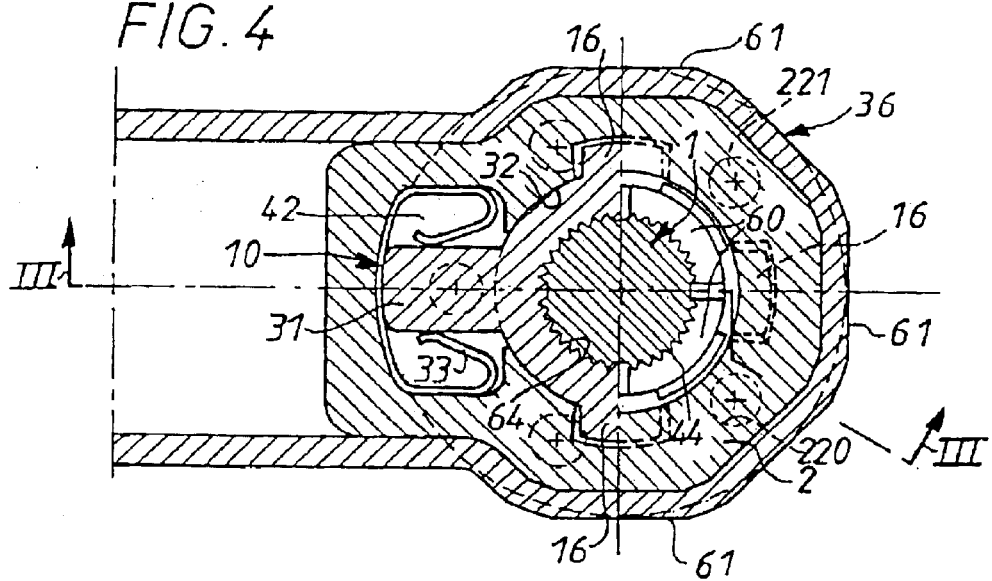
FIG. 4 is a view in section taken along the line IV—IV in FIG. 3.
Figure 5:
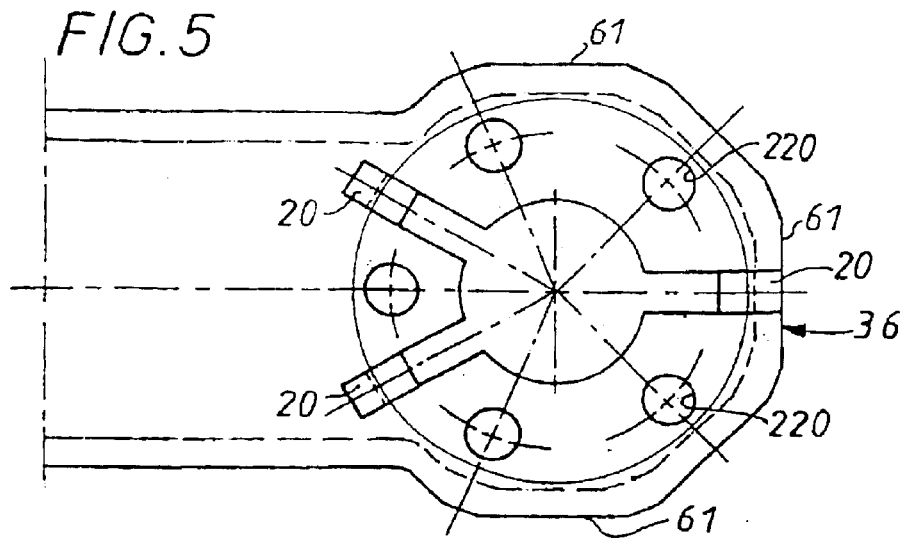
FIG. 5 is a top view of the arm on its own.

FIGS. 3, 4 and 5 show a variant of the foregoing type of annular adjustment by means of a radially limited play, in which variant the connecting ring 10 has a circular cylindrical external shape nested inside the cavity 32 of the hub 2 with at least one rib 31 projecting from that cylindrical shape and accommodated with some radial and annular clearance in a corresponding radial housing 42 of the hub 2. A relatively large rib 31 of this kind will advantageously be placed in a large housing of the hub 2, for example in an extension of the hub 2 along the axis of the windshield wiper arm, as can be seen in FIG. 4; its relatively large size means that spring means such as a spring 33 can be disposed between the rib 31 of the connecting ring 10 and the walls of the housing 42 of the hub 2. The spring means 33 simultaneously immobilize the ring 10, holding it at the theoretical adjustment point, and provide a buffer against end of stroke impacts in the event of accidental loosening.

The housing 36 includes assembly lugs 20, preferably formed as cut-outs in the sheet metal from which it is formed, and which will subsequently be bent over the edges of the locking washer 6, which is in turn attached to the nut 7 by an embossed flange thereof. Holes 220 in the housing 36 (see FIG. 5) receive cylindrical studs 221 molded in one piece with the hub 2 and thereafter melted in those holes by thermoforming, so fastening together the hub 2 and the housing 36.

The nut 7 and its locking washer 6 can also be held in position on the outside face of the housing 36 by a clipping washer member incorporating lugs with hooks at their ends nesting in orifices provided on the bottom or on the periphery of the housing 36.

The connecting ring 10 has in its upper part, at the end opposite its face bearing on the abutment base 3, a split sleeve 60 whose external rim is provided with a clipping flange 62 that engages against a corresponding rim of the hub 2 to maintain the connecting ring 10 at its spring 33 in their corresponding housings in the hub 2 before it is nested over the spindle 1.

The assembly members previously described enable the windshield wiper arm according to the invention to be pre-assembled into a sub-assembly ready to be mounted and adjusted on its spindle with a minimum of operations, which saves valuable time on an assembly line. The pre-assembled arm fitted with its abutment base 3 is then nested over the spindle 1, more or less at its final position, until the screwthreaded bearing surface 5 comes into contact with the first screwthread of the nut 7, the splines on the spindle 1 and the coupling ring 10 being also engaged over a certain length. The operative can then hold the windshield wiper arm in the required angular position with one hand and with the other hand engage his nut driver over the head of the nut 7 and lock the assembly.

FIGS. 6 and 7 show one end of a windshield wiper arm 2 (FIG. 6) adapted to be assembled with a spindle 1 (FIG. 7) of the type with a splined cylindrical bearing surface 4 joined to a screwthreaded end 5 intended to receive a washer 6 and a locking nut 7 for locking the end of the windshield wiper arm 2, whose opposite face bears on an abutment base 3 that will be fastened to the spindle 1 by nesting its splined central hole 8 over the transverse bearing surface 9 of the spindle 1 with the splines 144. The coupling ring 10 bears on the central part of the abutment base 3 and is constrained to rotate with the spindle 1 by virtue of its splined bore nesting over the splined bearing surface 4 of the spindle 1. The connecting ring is nested inside a corresponding housing formed on the bearing face of the end of the windshield wiper arm 2.

Figure 16:
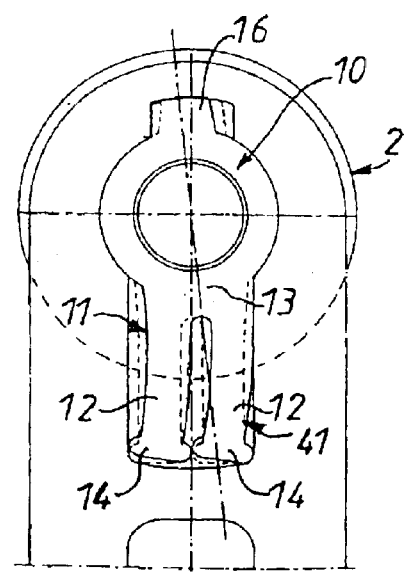
FIG. 16 shows a connecting ring as shown in FIGS. 11 to 13 flexed in its arm housing during adjustment of the angular position of the latter.

FIG. 8 shows the nesting of the connecting ring 10 over the splines 44 on the spindle 1, on the one hand, and in its housing in the end of the windshield wiper arm 2, on the other hand. In this embodiment of the invention, the connecting ring 10 has a radial rib 11 provided with two thin lugs 12 enabling it to flex elastically until its solid base 13, to which the lugs 12 are connected, comes into abutting engagement against the wall of the housing 42 (see FIG. 16). The end part 41 of the lugs 12 includes projecting beads 14 which come into contact with the wall of the housing and define flexing bearing points. Spaces 15 are provided along the lugs 12 so as not to impede their flexing. An additional abutment in the form of a short abutment rib 16 is provided opposite the elastic flexing rib 11. The dashed line contour 17 reflects the tapered walls of the housing for the ring 10.

This assembly, shown in the flexed position of the lugs on the elastic flexing rib, can absorb adjustment of the angular position of the windshield wiper arm relative to its spindle of the order of ±3°, which represents a movement of ±3 cm at the end of a 60 cm long windshield wiper arm, thus more than adequately covering the assembly spreads to be compensated.

Figure 9:
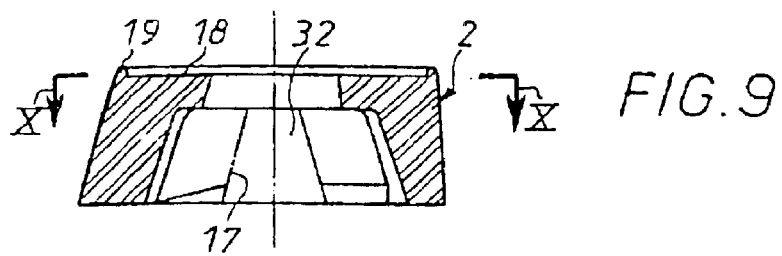
FIG. 9 shows a variant arm according to the invention in axial section taken along the line IX—IX in FIG. 10.
Figure 10:
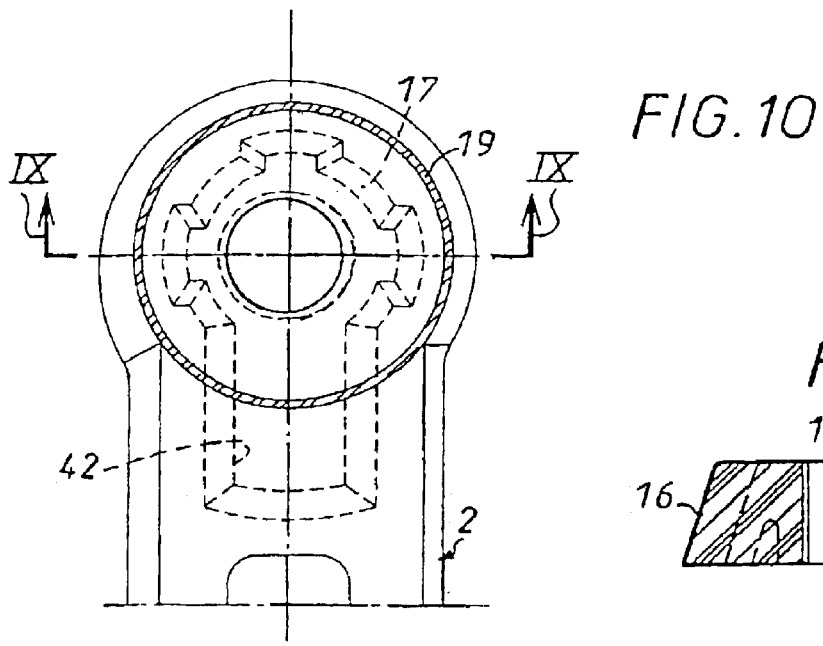
FIG. 10 is a view in section taken along the line X—X in FIG. 9.

FIGS. 9 and 10 show a hub 2 at the end of a windshield wiper arm of the pressure diecast type. It has, on the one hand, a plane circular face 18 provided with a centering rim 19 serving as a seat for the locking washer 6 and, on the other hand, on the opposite face, the cavity 32 for the connecting ring 10 shown in FIGS. 11 to 13. The assembly includes tapers enabling direct molding in a two-part mold, without necessitating additional mold slides. For drive arms inclined at 15°, for example, a taper angle of the walls of the cavity (32) of the order of 17° will be chosen, enabling direct removal from the mold.

This kind of taper will also have the advantage of no wedging action, all the more so in that it will transmit to the splines 64 assembling the connecting ring 10 to the spindle a radial banding pressure reinforcing the assembly along each circular sector between two flexing or abutment ribs. Loosening the retaining nut 7 by about half a turn will be sufficient to release the connecting ring 10 from being immobilized against the abutment 3 to enable angular adjustment of the arm 2 by flexing the lugs 12 of the connecting ring 10. Molding this ring from a synthetic material, for example that sold under the trade name Hostaform C 2521, enables a drive torque of approximately 60 Nm to be transmitted to a non-locked drive arm, i.e. without the mechanical drive normally assured by the contact of the base of the driver 2 on the abutment 3 and without the reinforcement of the banding effect due to clamping onto the tapered faces.

Figure 11:
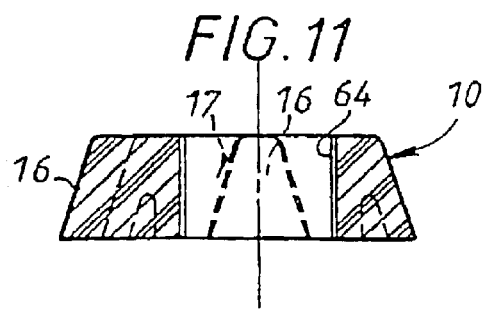
FIGS. 11, 12 and 13 show the corresponding connecting ring.
Figure 12:
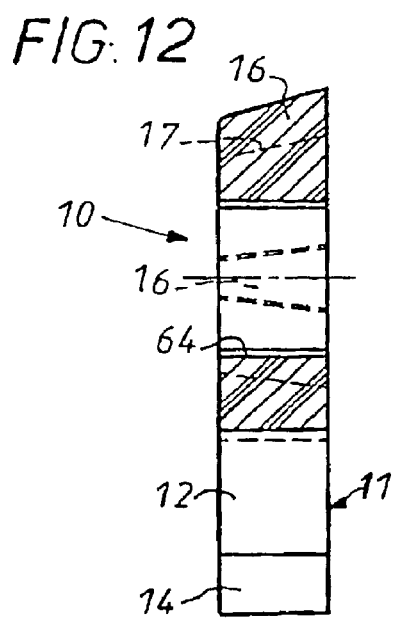
Figure 13:
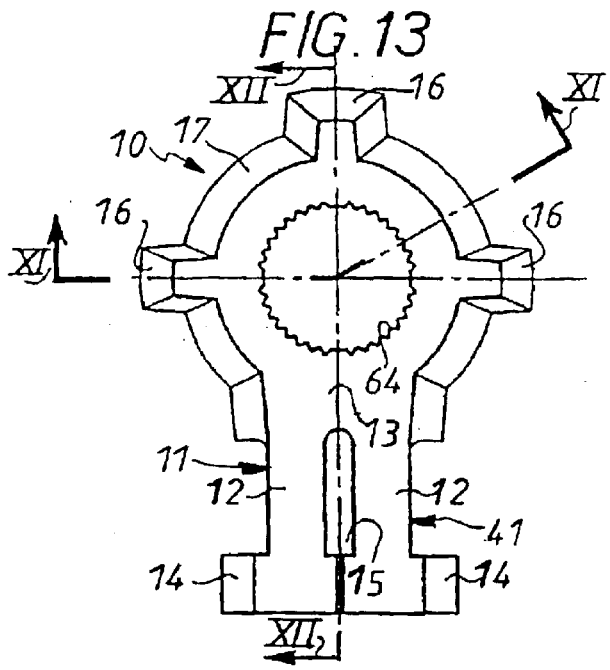

FIGS. 11, 12 and 13 show the corresponding connecting ring 10 with three radial abutment ribs 16 and a rib 11 extended by two flexible lugs 12 with end bearing claws 14, the hub 2 incorporating a cavity 32 of complementary shape, the same reference number 17 being used also to designate its taper.

Figure 14:
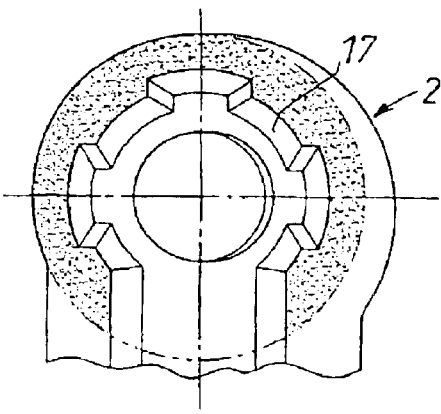
FIG. 14 shows the end of the arm shown in FIGS. 9 and 10 from below, showing the housing for the connecting ring and the remaining bearing surface for its bearing contact on the assembly bearing abutment base on the axis.
Figure 15:
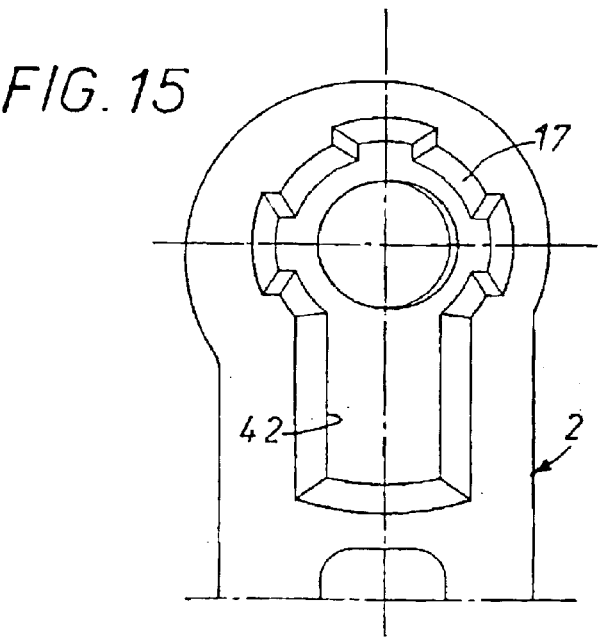
FIG. 15 is a bottom view of the arm.

FIGS. 14 and 15 show the same arm end as FIGS. 9 and 10, seen from below and showing the tapered cavity 32 for the connecting ring 10 described with reference to the preceding FIGS. 11, 12, 13, with the locking contact bearing surface of the abutment base 3 shaded in FIG. 14.

Figure 17:
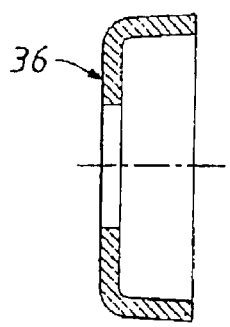
FIGS. 17 to 19 show in partial section an outer arm shell and FIGS. 17 and 19 are respectively views in section taken along the lines XVII—XVII and XIX—XIX in FIG. 18.
Figure 18:
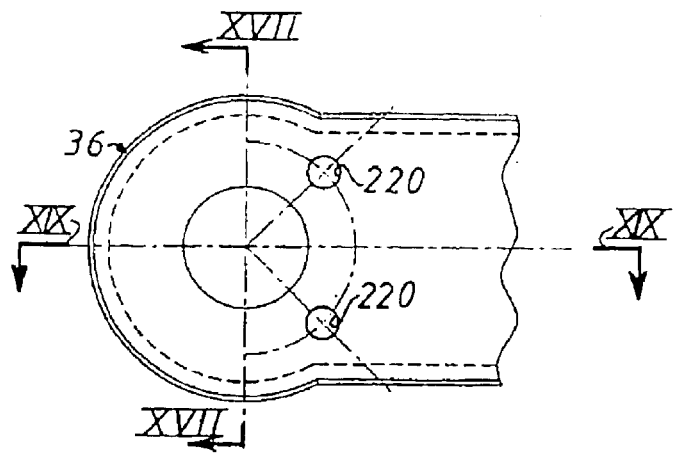
Figure 19:
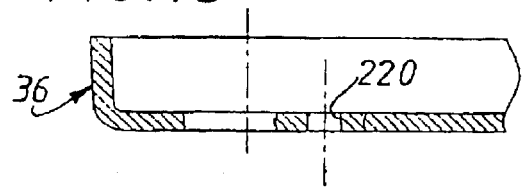
Figure 20:
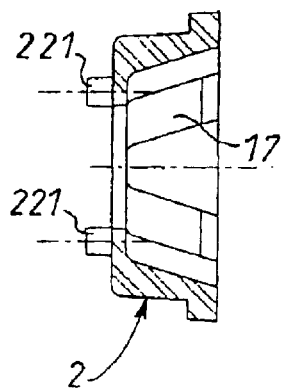
FIGS. 20 to 22 show in partial section a hub adapted to cooperate with the shell from FIGS. 17 to 19, FIGS. 20 and 22 being views in section taken along the respective lines XX—XX and XXII—XXII in FIG. 21.
Figure 21:
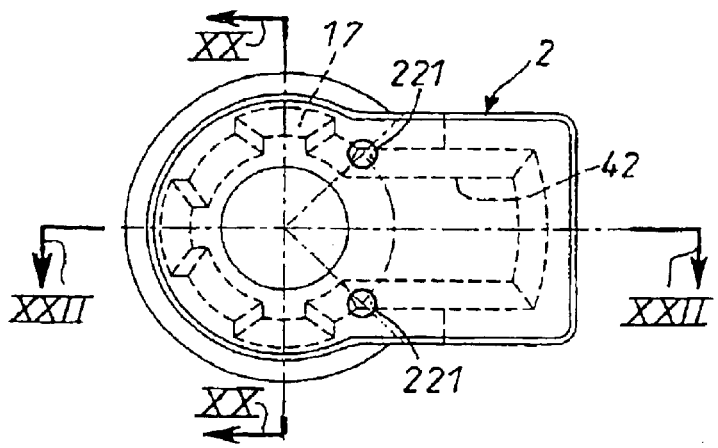
Figure 22:
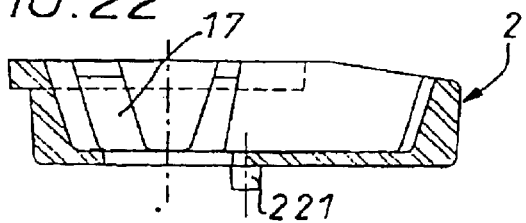

In FIGS. 17 to 22 the hub 2, shown on its own in FIGS. 20 to 22, is cast from a light metal and capped with a pressed and cut out sheet metal housing 36 shown on its own in FIGS. 17 to 19; the assembly is formed in the manner described with reference to FIGS. 3 to 5; to that assembly using the studs 221 there is added an assembly by forcible penetration of small splines formed on the outside flanks of the hub 2.

Figure 23:
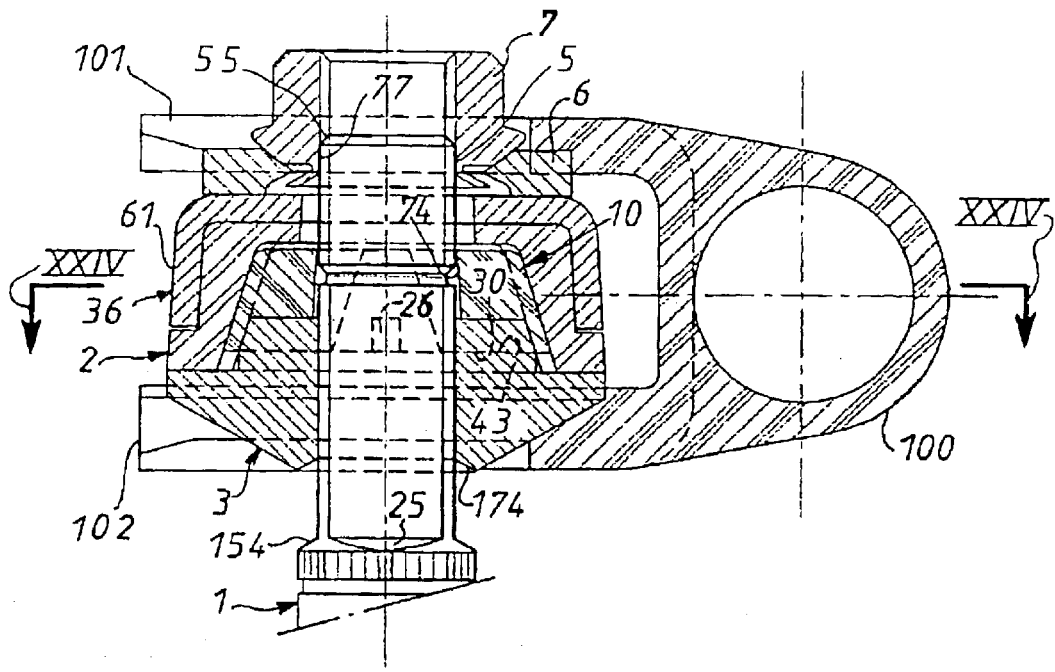
FIG. 23 is a view analogous to FIG. 1, 3 or 6, in section taken along the line XXIII—XXIII in FIG. 24, and shows a variant.
Figure 24:
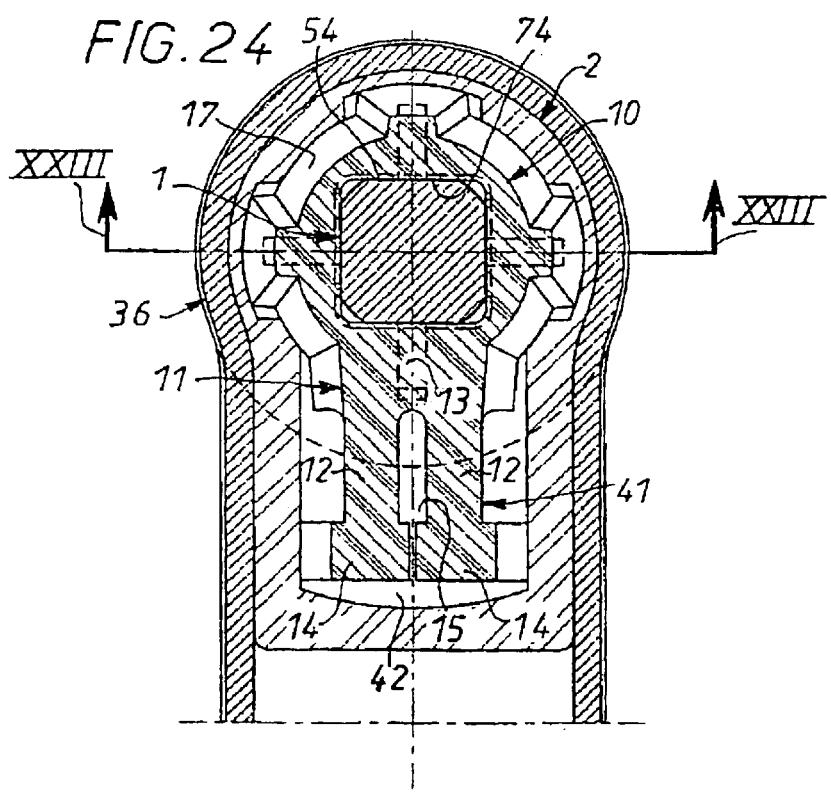
FIG. 24 is a view in section taken along the line XXIV—XXIV in FIG. 23.

In the variant of FIGS. 23 and 24, a removable assembly fork 100 or stirrup shown only in FIG. 23 is provided to facilitate placing the pre-assembled sub-assembly over the end of the spindle 1, for angular position adjustment and locking. The fork 100, which is preferably made from a plastics material, is removed after fitting and locking the arm to its spindle. The fork 100 has two top teeth 101 bearing on the washer 6 on either side of the nut 7. The bottom part of the fork 100 has two teeth 102 bearing on the abutment base 3 on either side of the hole therein to be fitted over the spindle 1. These bottom teeth 102 are connected by a semi-frustoconical shape 103 to facilitate guiding the end of the spindle 1 into the hole in the abutment 3 into which it is inserted. This sub-assembly is therefore ready to be fitted to and adjusted on its spindle with a minimum of operations, which saves valuable time on an assembly line. The preassembled arm fitted with its abutment base 3, previously oriented in more or less its final position, is nested over a portion of the splines of the spindle 1 until the nut 7 abuts against the end of the screwthread on the spindle 1. At fitting time, the operative takes up his nut driver, positions the windshield wiper in accordance with markings on the windshield, and tightens the nut 7 to the intended torque. Without having to put down his nut driver, he then performs the same operation on the second windshield wiper arm. The holding fork 100 is removed after tightening the nut 7.

In this embodiment, the cooperating means 74 are square and the transverse bearing surface 154 of the spindle 1 consists of four segments or flats 25 that are preferably inclined and extend the four plane faces, each of which corresponds to one side of the square; the abutment base 3 has corresponding flats 174 at the bottom.

Figure 25:
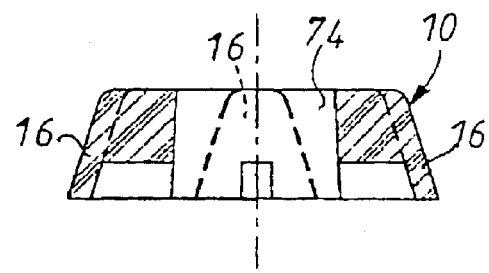
FIGS. 25 to 27 show the ring from the device shown in FIGS. 23 and 24 on its own, FIG. 26 being a view in section taken along the line XXVI—XXVI in FIG. 27.
Figure 26:
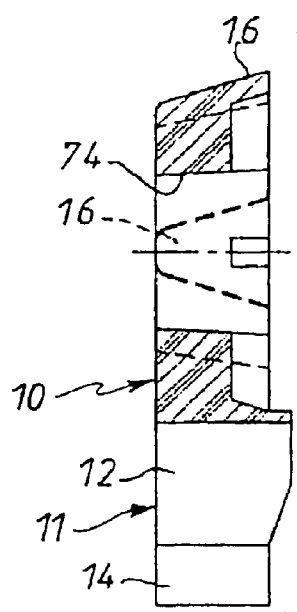
Figure 27:
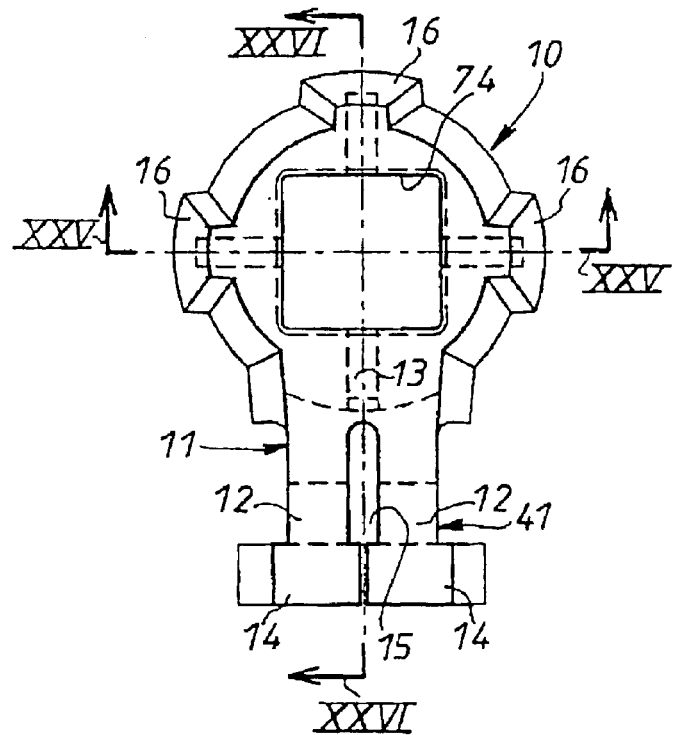

FIGS. 25 to 27 show on its own the connecting ring 10 corresponding to the variant of FIGS. 23 and 24.

Figure 28:
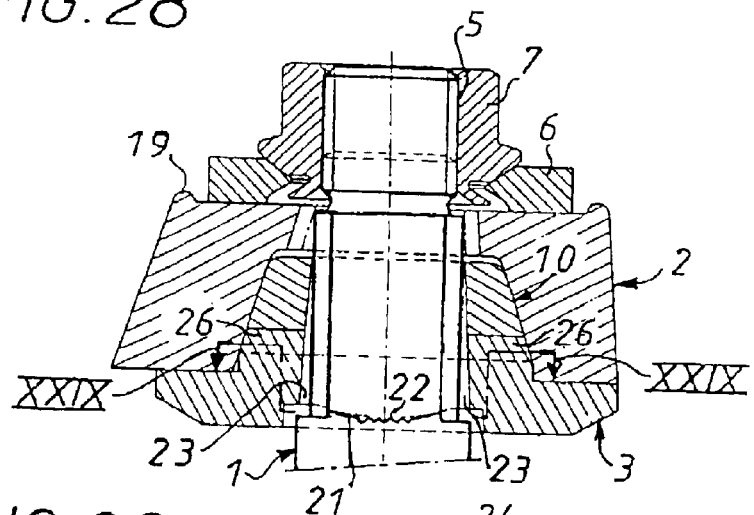
FIG. 28 is a view analogous to FIG. 6 and corresponds to a variant.

FIG. 28 shows in axial section how the end of a windshield wiper arm 2 in accordance with the invention is assembled to its spindle 1 in its normal position perpendicular to that spindle, bearing on the abutment base 3, which in this embodiment has two convex cylindrical or spherical shoulder surfaces 21 provided with teeth 22 perpendicular to the spindle and parallel to each other; the abutment base 3 is nested over the transverse bearing surface of the spindle 1, which in this embodiment is of complementary shape, with a transverse clearance 23 enabling it to tilt relative to its normal position, its convex toothed bearing surfaces 22 nesting over complementary concave toothed shoulder surfaces 24 of the spindle 1. The FIG. 29 half-section shows these surfaces 24 and the assembly clearance 23 at this level, resulting from conical ovallzation of the hole for assembling the connecting ring 10 and the abutment base 3.

Figure 29:
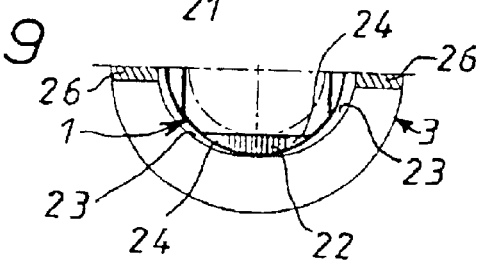
FIG. 29 is a view in section taken along the line XXIX—XXIX in FIG. 28.
Figure 30:
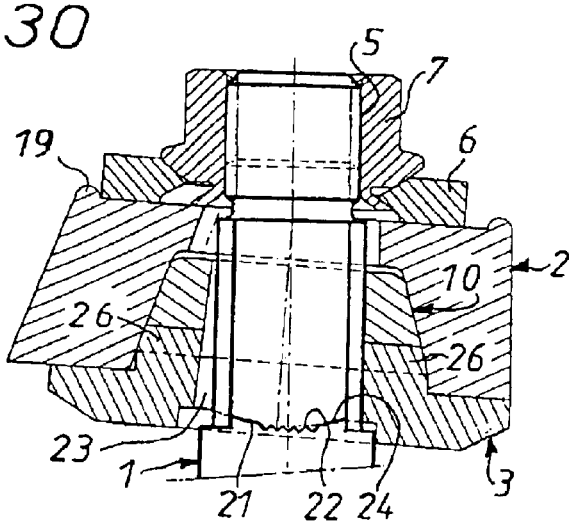
FIG. 30 is analogous to FIG. 28 and shows another position of the abutment base.

FIG. 30 shows the same assembly as FIGS. 28 and 29 with the abutment base 3 in an inclined position. The mutual nesting of the teeth of the bearing surfaces maintains the chosen inclination of the abutment base 3 when it is first fitted. This results in an adjustment of the inclination of the rubber windshield wiper, which is positive or negative according to the chosen direction.

The same type of adjustment can be effected, with the same components, to adjust the bearing pressure of the windshield wiper arm, by operating on its longitudinal inclination, which would have the effect of modifying the tension of the bearing spring. To this end, it will suffice to offset the position of the spindle 1 in its drive link by 90°. This choice will substitute the facility to incline the arm for that of inclining the wiper previously referred to.

Figure 31:
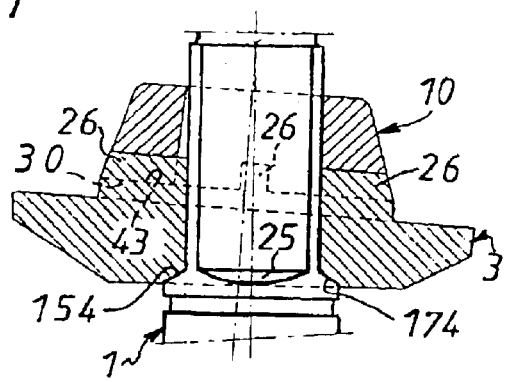
FIG. 31 is analogous to FIG. 28 and corresponds to a variant.

FIG. 31 shows a variant of the inclination adjustment, applied to an assembly of the kind shown in FIGS. 23 and 24, in which one end of the spindle 1 has four flats giving it a square section over which is nested the abutment base 3 whose bearing face 43 is inclined, for example at 3°, and which transmits that inclination to the connecting ring 10, via its bearing face 30; the connecting ring 10 is constrained to rotate with the abutment base 3 by the four tongues 26 over which it is nested. This inclination is therefore transmitted to the windshield wiper arm that it receives. Different angular positions of the connecting ring 10 and therefore of the arm 2, not shown here, will be obtained by modifying the position of the abutment base 3 on its nesting square on the spindle 1 by 90° or 180°.

Figure 32:
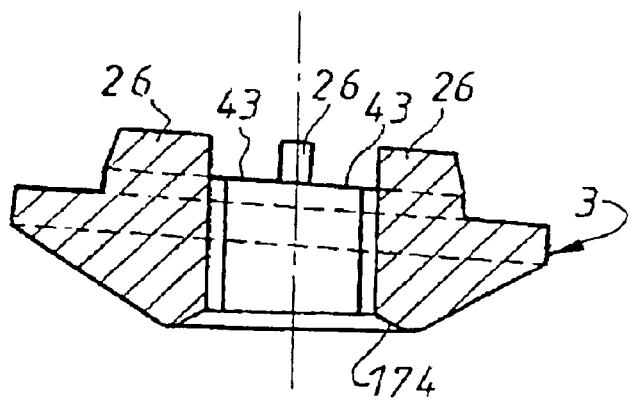
FIGS. 32 and 33 show the abutment base from FIG. 31 on its own, FIG. 32 being a view in section taken along the line XXXIV—XXXIV in FIG. 33.
Figure 33:
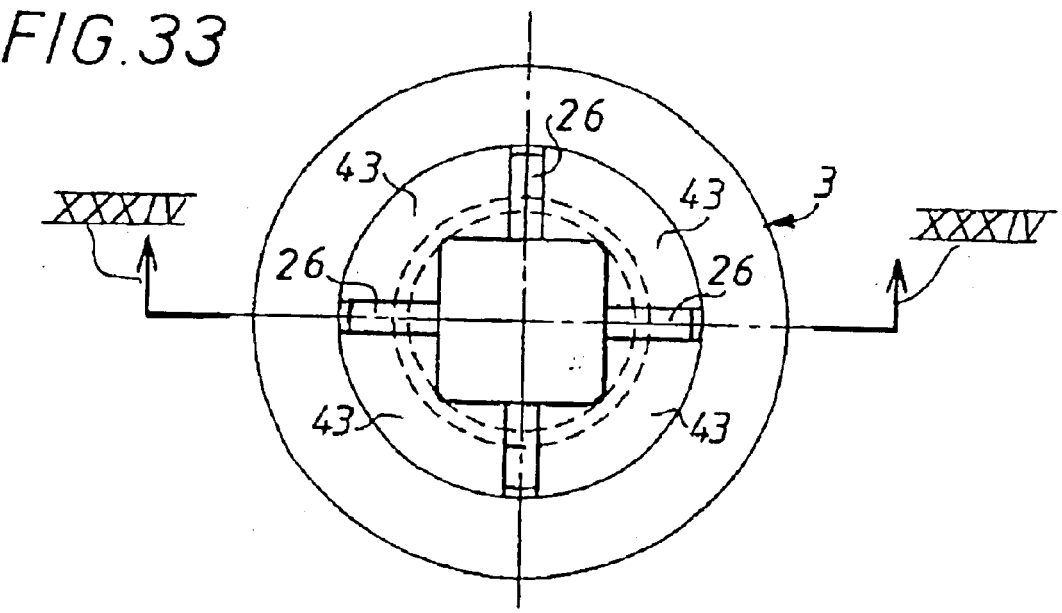

FIGS. 32 and 33 show the abutment base 3 from FIG. 31 on its own.

Figure 34:
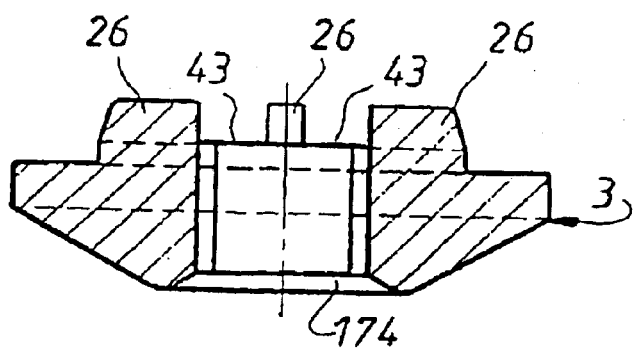
FIG. 34 is a view analogous to FIG. 32 and shows a variant.

FIG. 34 shows, for comparison, an abutment base of this kind with no inclined bearing face.

Figure 40:
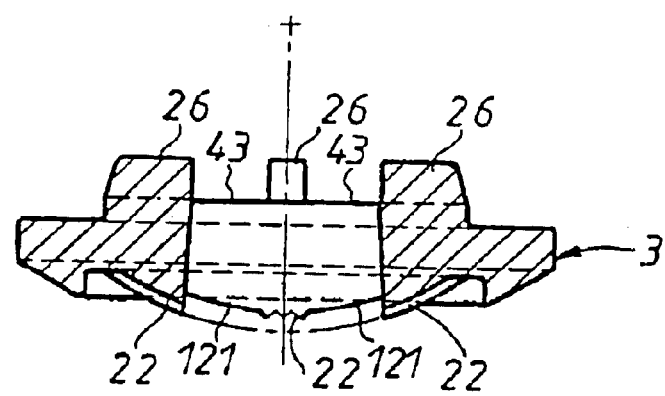

The two adjustments can be combined, as shown in section in FIG. 40, by providing on the abutment 3 two sets of convex spherical bearing surfaces offset at 90° and bearing on corresponding concave spherical surfaces forming the transverse bearing surface of the spindle 1.

As just explained, these inclinations necessitate providing the transverse bearing surface of the spindle with convex or concave cylindrical or spherical shoulder surfaces complementary to those of the abutment base.

Clearly, it is easier to form a transverse bearing surface on a spindle in the form of flats.

This being so, to obtain the above inclinations, the invention provides such flats on the spindle with and transfers the shoulder surfaces to an intermediate washer disposed axially between the flats and the abutment base 3.

Figure 35:
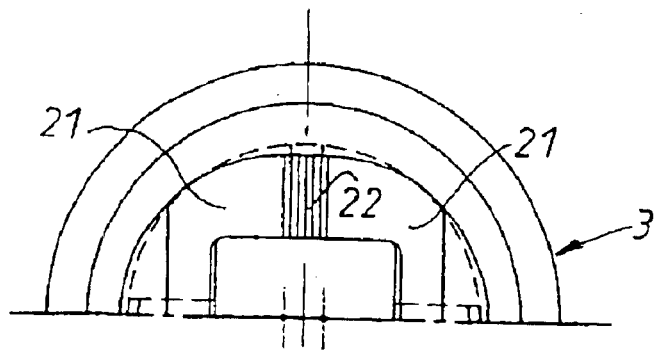
FIGS. 35 and 36 show a variant abutment base adapted to cooperate with a washer shown in FIGS. 37 and 38.
Figure 36:
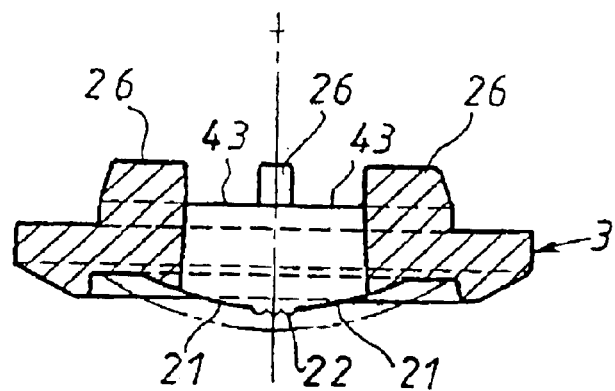
Figure 37:
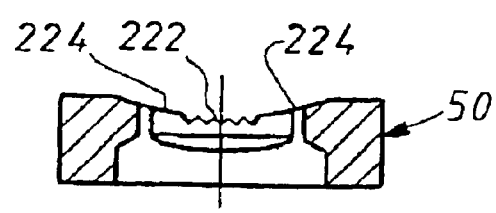
Figure 38:
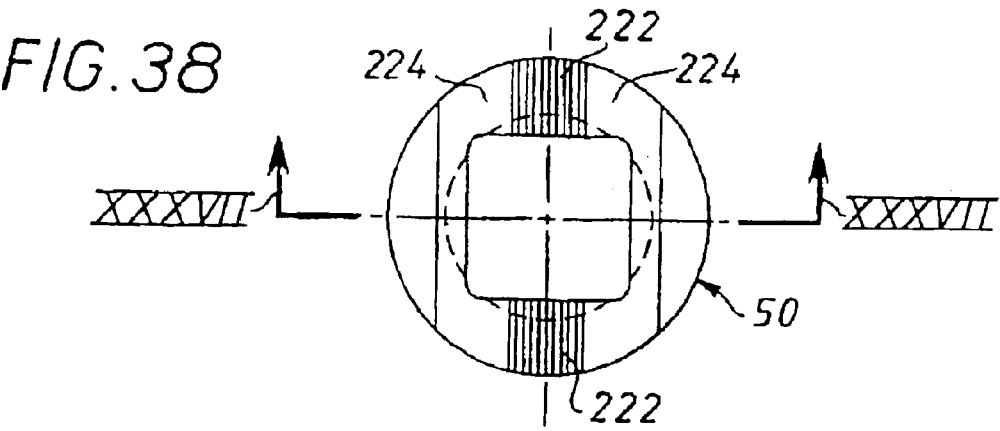

FIGS. 37 and 38 show this kind of washer 50 which have cylindrical shoulder surfaces 224 with teeth 222 and are adapted to cooperate with the bearing base 3 shown in FIGS. 35 and 36, in which its shoulder surface 21 provided with teeth 22 can be seen.

With this abutment washer 50 provided with cylindrical shoulder surfaces 224, the two adjustments previously referred to can be obtained simply by modifying the position of the abutment washer on the spindle, without having to predetermine the position of the spindle relative to its indexed drive link.

Figure 39:
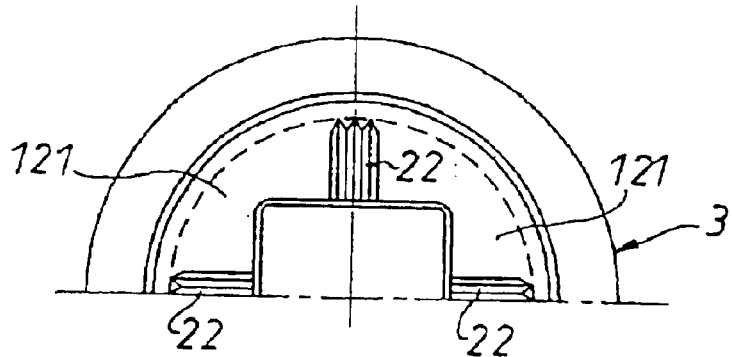
FIGS. 39 to 42 are views analogous to FIGS. 35 to 38 and correspond to a variant.
Figure 41:
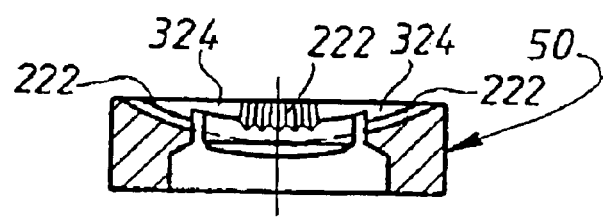
Figure 42:
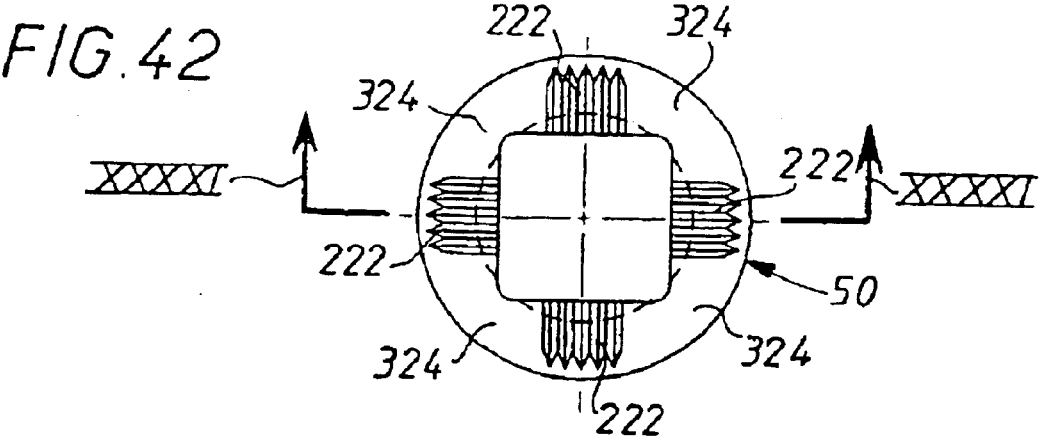

In FIGS. 41 and 42, the intermediate washer 50 has spherical shoulder surfaces 324 provided with teeth 222 and its spherical shoulder surfaces 121 provided with teeth 22 are adapted to cooperate with the abutment base 3 shown in FIGS. 39 and 40.

The set of convex and concave spherical surfaces forms respective sectors of the same spherical dome centered on the spindle 1 and a ball-joint locked by the nesting of the teeth, whose 90° relative location enables longitudinal sliding of the nested teeth to enable adjustment of the relative location of the perpendicular sets of teeth. A very flexible adjustment system is therefore obtained which is still of relatively low cost because of its small number of components, the same device being adaptable, through such adjustments, to suit different types of windshield.

What is claimed is:

1. A device for fixing a windshield wiper arm hub (2) to a spindle (1), the device comprising locking means (6, 7) for locking the arm to the spindle (1), a cavity (32) formed in the hub (2) containing means for adjusting the angular position of the arm relative to the spindle (1), said hub (2) bearing on an abutment base (3) nested over a bearing surface (4) of the spindle (1), wherein the locking means (6, 7) is adapted to assume either a clamping position or an unclamping position, said adjustment means include a connecting ring (10) constrained to rotate with the spindle (1) and accommodated in said cavity (32) of the hub (2) with some play allowing limited relative angular movement between the connecting ring (10) and the hub (2) in the unclamping position of the locking means (6, 7), whereas all relative movement between the connecting ring (10) and the hub (2) is prohibited in the clamping position of the locking means (6, 7).

2. A fixing device according to claim 1, characterized in that the connecting ring (10) has a cylindrical outside contour nested inside a corresponding bore of the hub (2), its rotation in said bore being angularly limited by at least one radial rib (11, 31) able to oscillate in at least one corresponding radial housing (42) of the hub (2), and wherein spring means (33) are disposed between radial walls of the rib (11, 31) and facing radial walls of the radial housing (42).

3. A fixing device according to claim 1, characterized in that it includes a metal outer shell forming a housing (36) around the hub (2).

4. A fixing device according to claim 3, characterized in that the shapes of the housing (36) and the hub (2) and the height of flanks (61) of the housing (36) relative to the hub (2) are such that the bottom and the flanks of the housing bear on the top and flanks of the hub (2), respectively, said hub (2) itself bearing on the abutment base (3), the flanks of the hub (2) being splined.

5. A fixing device according to claim 1, characterized in that the arm is held perpendicular to the spindle (1) by the abutment base (3), which abuts on a transverse bearing surface (9) of the spindle (1).

6. A fixing device according to claim 1, characterized in that the connecting ring (10) is constrained to rotate with the spindle (1) by means (44–64, 144–164, 54–74, 154–174) having cooperating or complementary shapes.

7. A fixing device according to claim 6, characterized in that said means having cooperating shapes consist of polygons.

8. A fixing device according to claim 6, characterized in that the means (64, 74) with cooperating shapes are carried directly by the connecting ring (10) and means (44, 54) with cooperating shapes are carried by the spindle (1).

9. A fixing device according to claim 8, characterized in that the connecting ring (10) is nested in the corresponding cavity (32) of the windshield wiper arm hub (2) with a taper (17).

10. A fixing device according to claim 9, characterized in that the taper (17) of the external contour of the connecting ring (10) and the corresponding walls of the cavity (32) of the hub (2) is at least equal to or greater than the taper of a arm hub (2) enabling its direct extraction from a mold.

11. A fixing device according to claim 6, characterized in that the connecting ring (10) is constrained to rotate with the spindle (1) by the abutment base (3), the means (164, 174) with cooperating shapes are carried by the abutment base (3) and means (144, 154) with cooperating shapes are carried by a transverse bearing surface (9) of the spindle (1), complementary means (26), being provided for the driving of the connecting ring (10) by the abutment base (3).

12. A fixing device according to claim 11, characterized in that the distance from a face of the abutment base (3) bearing on the transverse bearing surface on the spindle (1) to an entry (77) of a screwthread of a nut is greater than the distance between an entry of the means with complementary shapes carried by the spindle (1) and the top (55) of a screwthread on the spindle so that the means with complementary shapes of the abutment base (3) can be engaged over the means with complementary shapes of the spindle (1) before tightening the nut (7).

13. A fixing device according to claim 6, characterized in that the distance from a bearing face (30) of the connecting ring (10) on the abutment base (3) to the entry (77) of a screwthread of a nut is greater than the distance between the entry of the means with complementary shapes carried by the spindle (1) and the top (55) of a screwthread on the spindle, so that the means with complementary shapes of the ring (10) can be engaged over the means with complementary shapes of the spindle (1) before tightening the nut (7).

14. A device according to claim 1, characterized in that there is at least one angular movement abutment rib (16) on the periphery of the connecting ring (10).

15. A fixing device according to claim 1, characterized in that it consists of a pre-assembled sub-assembly at the end of the windshield wiper arm including, a nut (7) and a locking washer (6) held in position on the external face of the windshield wiper arm hub (2) by a retaining fork (100) having two top teeth (101) bearing on the washer (6) on either side of the nut (7) and two bottom teeth (102) bearing on the abutment base (3) on either side of a hole (8) for fitting the retaining fork over the spindle (1), the bottom teeth (102) being connected by a semifrustoconical shape (103) forming a funnel to facilitate guiding the end of the spindle (1) into the hole (8) in the abutment base (3).

16. A fixing device according to claim 1, characterized in that the spindle (1) has four flats which impart a square section on it and over which is nested the abutment base (3), the abutment base having a bearing base (43) that is inclined and which transmits that inclination to the connecting ring (10), constrained to rotate with the bearing base (43) of the abutment base (3) by complementary means (26) consisting of four tongues over which the connecting ring is nested, different angular locations of the connecting ring (10) and therefore of the windshield wiper arm (2) being obtained by modifying the relative location of the abutment base (3) on its nesting square on the spindle (1) by 90° or 180°.

17. A fixing device according to claim 1, characterized in that the length over which the hub (2) of the windshield wiper arm is nested, including the length over which the combination of the abutment base (3) and the connecting ring (10) is engaged over the spindle (1), ensures retention of the hub (2) on the spindle (1) and bracing of the hub (2) to press a windshield wiper blade onto a windshield.

18. A device for attaching a windshield wiper arm hub to a spindle, the hub having a cavity and bearing on an abutment base that is nested over a bearing surface of the spindle, the device comprising:

a lock that locks the hub to the spindle, said lock having a clamping position and an unclamping position;

a connecting ring inside the cavity that is constrained to rotate with the spindle, and when the lock is in the unclamping position allows limited angular motion between said connecting ring and the hub, and, when the lock is in the clamping position, prohibits relative movement between said connecting ring and the hub, said connecting ring having a cylindrical outside contour nested inside a corresponding bore of the hub and at least one radial rib that oscillates in at least one corresponding radial housing of the hub, rotation of said connecting ring in the bore being angularly limited by said at least one radial rib; and a spring between radial walls of said at least one radial rib and facing radial walls of the radial housing.

19. A device according to claim 18, characterized in that the radial rib (11) has an elastic end portion (41) adapted to bear on a portion of the corresponding wall of the radial housing (42).

20. A device according to claim 19, characterized in that the radial rib (11) can flex elastically because it has a projecting shape (14) at its end which alone bears on the wall of the radial housing (42) and allows free flexing of the rib (11) in the housing (42).

21. A device according to claim 19, characterized in that the radial rib (11) has at least one flexing lug (12).

22. A device according to claim 21, characterized in that the length of the flexing lugs (12) is less than the radial depth of the housing (42), the base of the rib (11) forming an abutment bearing on a portion of the corresponding wall of the housing (42) limiting angular movement of the arm while it is being adjusted during first fitting or if it is loosened.

* * * * *